United States Patent [19]

Hayashi

[11] 4,266,593
[45] May 12, 1981

[54] SLIP-PREVENTION DEVICE FOR VEHICLE TIRES

[76] Inventor: Michio Hayashi, Housing Corporation's Apartment House 50-718, 6-ban, Akabanedai 1-chome, Kita-ku, Tokyo, Japan

[21] Appl. No.: 37,835

[22] Filed: May 10, 1979

[51] Int. Cl.³ .............................................. B60C 27/00
[52] U.S. Cl. ................................. 152/218; 152/221; 152/374; 301/37 R
[58] Field of Search ............... 152/208, 213 A, 213 R, 152/216, 217, 218, 219, 221, 222, 210, 211, 173, 177, 374; 156/114; 238/14; 301/38 R, 39 C, 41 R, 42, 37 R; 260/5, 42.32, 42.47, 762, 2.3; 525/236, 241; 106/36

[56] References Cited

U.S. PATENT DOCUMENTS

| | | | |
|---|---|---|---|
| 1,342,753 | 6/1920 | McGeorge | 152/221 X |
| 1,973,748 | 9/1934 | Caldwell | 260/762 UX |
| 2,341,316 | 2/1944 | Ederer | 152/221 |
| 2,690,461 | 9/1954 | Steeves | 152/211 X |
| 3,367,382 | 2/1968 | Ewing | 152/216 |
| 3,562,193 | 2/1971 | Leeks et al. | 260/42.32 X |

*Primary Examiner*—William A. Powell
*Assistant Examiner*—Thomas Bokan
*Attorney, Agent, or Firm*—Birch, Stewart, Kolasch & Birch

[57] ABSTRACT

A slip prevention mat for vehicle tires which comprises a net-like structure having a rhombic lattice, said net-like structure being made of a rope provided with a cover layer, said cover layer being made of a natural or synthetic resinous material, first connecting means connected to one side of said net-like structure, for securing the net-like structure together at a position on the inside of the tire and second connecting means connected to the other side of said net-like structure for securing the net-like structure together at a position on the outside of the tire.

8 Claims, 6 Drawing Figures

SLIP-PREVENTION DEVICE FOR VEHICLE TIRES

BACKGROUND AND SUMMARY OF THE INVENTION

The present invention relates to a device for preventing cars from sliding and causing accidents. More particularly, the present invention relates to a slip-prevention device for vehicle tires.

According to the present invention, there is provided a slip-prevention device for vehicle tires consisting of a support body provided with bolt-nut holes at its bottom for fixing the device to a tire wheel, and a ring groove containing an elastic ring mounted therein, said ring being connected to pulling strings by hooks for fixing a slip prevention mat to a tire. The present invention is particularly useful when applied to a tire which contains bolts which project from the wheel when the wheel cap is removed.

It is known to use metal or non-metal chains for slip-prevention purposes. The conventional metal chains are designed in the form of a ladder shaped or diamond shaped net. The ladder net is particularly effective for the prevention of sideways slippage. However, metal chains in general, produce a metallic noise when used on tires for running on a snowy road. Furthermore, metal chains tend to damage cars and roads, as well as the tires due to their rigidity.

Non-metal chains which are made of a synthetic resin or a special rubber are light in weight and are comfortable for drivers to use, but are weak in the area of preventing sideways slippage.

The conventional metallic or non-metallic chains are fixed to the tire structure by stoppers so that the chains may not be readily taken off. However, it has sometimes occurred that the tire and the chains are not tightly connected to each other and therefore, the tire tends to rotate within the chains, thereby diminishing the slip prevention effect.

Accordingly, one of the objects of the present invention is to provide a slip prevention device for vehicle tires which can be easily and swiftly applied to a vehicle tire, and which can tightly envelop the tire.

Another object of the present invention is to provide a slip prevention device which can prevent vehicle tires from slipping on snowy or icy roads.

Contrary to the conventional chains, the slip-prevention device according to the present invention includes a support body which is fixed to the tire and also fixes the slip prevention mat firmly to the tire, thereby removing any possibility of loosening the mat. According to the present invention, the support body has a ring groove into which an elastic pulling ring is mounted. The ring is engaged by hooks connected to strings which pull the band mat so that it firmly surrounds the tire.

Still another object of the present invention is to provide a slip prevention device which is light in weight so that it can be easily handled, and which has an elastic structure which cannot damage tires, vehicles and roads.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
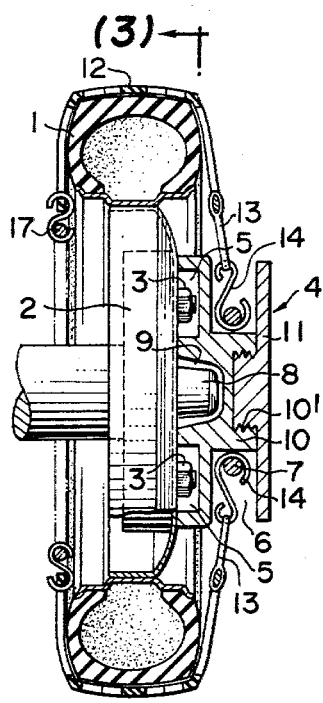
FIG. 1 is a side sectional view of the device of the present invention applied to a tire.
Figure 3:
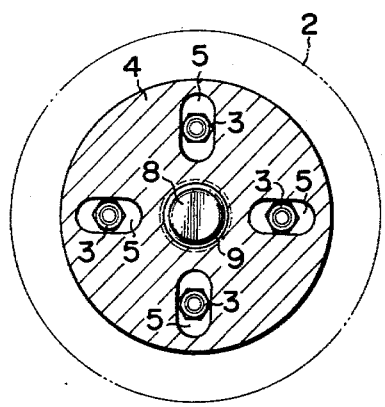
FIG. 3 is a section taken along the line (3)—(3) of FIG. 1.
Figure 2:
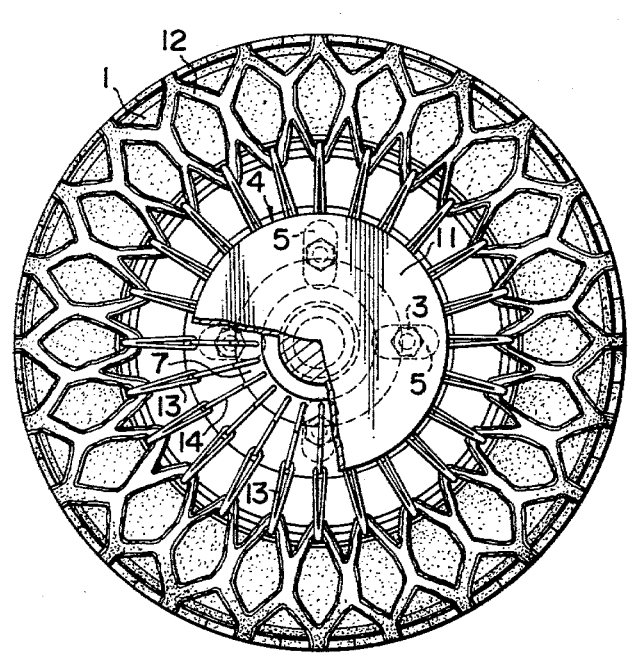
FIG. 2 is a plan view, partially cut out, of the device of the present invention applied to a tire.

In FIG. 1, there are shown bolt and nut holes 5 for receiving bolts and nuts 3 projecting from a wheel 2 for a tire 1. A synthetic resin-made support body 4 having an elastic pulling ring 7 is disposed in a groove 6 of the body 4. At the bottom of the synthetic resin-made support body 4, there are provided the bolt holes 5 for receiving bolts 3 which fix the tire wheel 2 to the support body 4. A recess 9 is provided for receiving a hub cap 8 projecting from the wheel 2. The four or five bolt holes 5 provided in the body 4, has a depth sufficient for receiving the bolts 3 projecting from the wheel 2 for various kinds of tire and a diameter corresponding to that of the nuts 3. When the support body 4 is mounted outside the wheel 2 by cooperating with the holes 5 so as to receive the nuts 3, the body 4 is fixed to the wheel and rotates integrally with the tire.

To a cylindrical portion 10 of the body 4 is threaded a screw-threaded extension of a plate 11, said plate 11 and cylindrical portion 10 forming a ring groove 6. Since the plate 11 can be readily removed from the base of the body 4, the ring 7 can be easily placed in the groove 6 or removed from the groove 6. The groove may be also formed by cutting into the outside portion of the support body instead of following the embodiment shown in FIG. 1 of the drawings.

Figure 4:
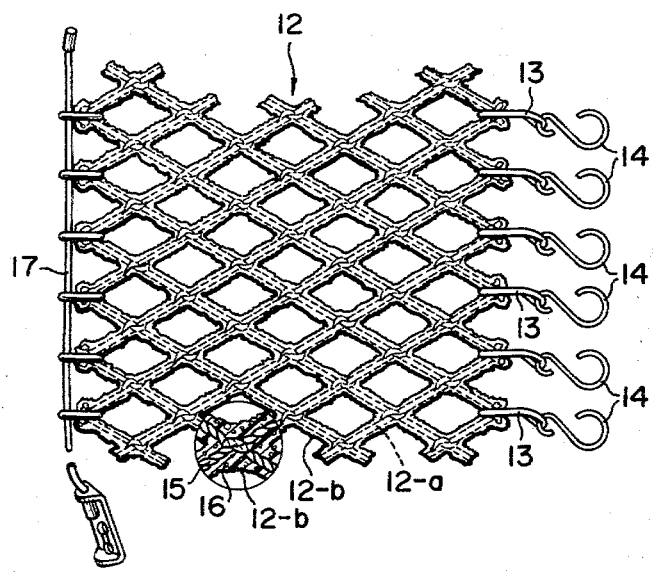
FIG. 4 is an enlarged view of a slip prevention mat of the device of the present invention.
Figure 5:
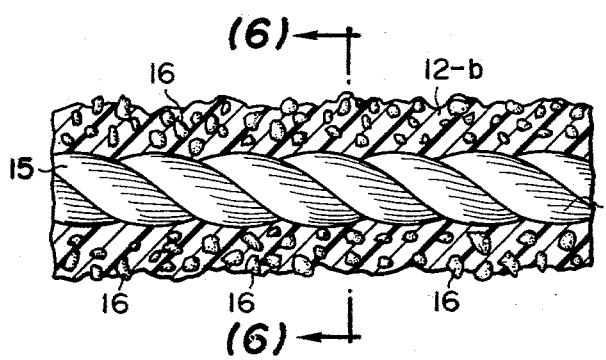
FIG. 5 is an enlarged view of a string portion forming the mat of the present invention.
Figure 6:
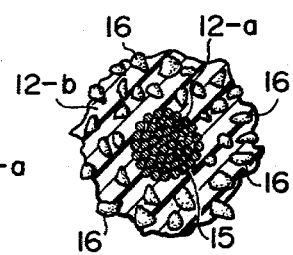
FIG. 6 is a section taken along line (6)—(6) of FIG. 5.

The ring 7 which is fixed in the groove 6, may be made of rubber or may be a coiled spring, and is operatively connected with hooks 14 of strings 13 which engage with a slip-prevention mat 12 so that the mat covers the entire tire 1. The mat 12 consists of rope 15 made of a natural or synthetic resinous fibers, such as for example, nylon, polypropylene, butadiene rubber, styrene-butadiene copolymer, acrylonitrile-butadiene copolymer, isoprene rubber, chloroprene rubber, acrylic rubber, ethylene-propylene-diene terpolymer, ethylene-vinyl acetate copolymer, natural rubber, flax, or a metallic wire, which is woven into a rhombic lattice form, as can be seen by referring to FIG. 4, in a manner to produce big knots which improve the slip-prevention effect. The mat 12 is formed of a rope portion 12-a which has been impregnated by a synthetic resin or rubber solution coating so that a cover layer 12-b is formed over the 12-a rope portion after the solution is dried. The synthetic resin or rubber which can be used includes polypropylene, butadiene rubber, styrene-butadiene copolymer, acrylonitrile-butadiene copolymer, isoprene rubber, chloroprene rubber, acrylic rubber, ethylene-propylene-diene terpolymer, ethylene-vinyl acetate copolymer and natural rubber. The solution may include wasted vehicle tire pieces 16 which can be seen in FIGS. 5 and 6, so that the layer 12-*b* may be finished in an uneven manner. The mat 12 has fastening strings 17 at a position inside of the tire 1, when applied, and elastic pulling strings 13 disposed at the outside of the tire said elastic pulling strings being hooked to the ring 7.

As will be understood by the description above, the slip-prevention device for vehicle tires according to the present invention, has a structure such that the outside portion 13 of the mat 12 is connected by means of the ring 7 to the support body 4 which is fixed to the tire and, accordingly, there is no situation which occurs where only the tire rotates within the mat, as is often the case with the use of conventional chains.

Furthermore, since the bolt holes provided in the support body 4 contain a longitudinally extending axis, the device can be applied to the various kinds of tires wherein the distance from the central axis of the tire to the bolts thereof varies. Moreover, since the mat is formed with a rhombic lattice, the device, according to the present invention, exhibits an improved slip prevention effect than that of conventional slip prevention chains having a ladder form net. The effect is further strengthened by finishing the mat to have an uneven or rough surface.

In addition, if wasted old tires and the like are used as slip prevention pieces which are contained in the cover layer of mat, and if regenerated rubber is used as material for the mat rope, the mat of the present invention can be produced at a low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A slip prevention device comprising a support body provided with a plurality of bolt holes, said support body being adapted to be attached to the wheel of a vehicle, said support body defining an annular groove, elastic ring means disposed in said annular groove and a slip prevention mat for covering the surface of a vehicle tire, said slip prevention mat comprising a net-like structure having a rhombic lattice, said net-like structure being made of a rope provided with a cover layer, first connecting means connected to one side of said net-like structure for securing the net-like structure together at a position on the inside of the tire and second connecting means connected to the other side of said net-like structure, said second connecting means being connected to the elastic ring groove disposed in the annular ring of the support body at a position on the outside of the tire.

2. The slip prevention device of claim 1 wherein the first connecting means includes hook means and a fastening string, said hook means connecting said fastening string to said one side of the net-like structure.

3. The slip prevention device of claim 2 wherein the second connecting means includes hook means attached to said other side of the net-like structure.

4. The slip prevention device of claim 1 wherein the rope is made of a material selected from the group consisting of natural fibers, synthetic fibers, and metallic wire.

5. The slip prevention device of claim 4 wherein the cover layer is made of a natural or synthetic resinous material.

6. The slip prevention device of claim 5 wherein the net-like mat is woven into said rhombic lattice in such a manner as to produce knots which enhance the slip-prevention effect.

7. The slip prevention device of claim 6 wherein the cover layer contains a plurality of vehicle tire pieces which provide an uneven surface in the cover layer.

8. The slip prevention device of claim 1, wherein the bolt holes have an elongated configuration for accommodating tires having different bolt placements relative to the central axis of the tire.

* * * * *